United States Patent [19]

Nagase et al.

[11] Patent Number: 5,216,733
[45] Date of Patent: Jun. 1, 1993

[54] POLARIZATION MAINTAINING OPTICAL FIBER CONNECTOR INCLUDING POSITIONING FLANGE AND METHOD UTILIZING SAME

[75] Inventors: Ryo Nagase, Mito; Yasuhiro Ando, Hoya, both of Japan

[73] Assignee: Nippon Telegraph and Telephone Corporation, Tokyo, Japan

[21] Appl. No.: 848,895

[22] Filed: Mar. 10, 1992

[30] Foreign Application Priority Data

Mar. 11, 1991 [JP] Japan .................................. 3-45253
Aug. 16, 1991 [JP] Japan .................................. 3-205930

[51] Int. Cl.⁵ ............................................. G02B 6/26
[52] U.S. Cl. ........................................ 385/60; 385/52; 385/78; 385/80; 385/139; 385/11
[58] Field of Search ................. 385/11, 60, 78, 80, 385/85, 88, 123, 137, 139, 147, 52, 100

[56] References Cited

U.S. PATENT DOCUMENTS

| | | | |
|---|---|---|---|
| 4,818,047 | 4/1989 | Takuma et al. | 385/11 |
| 4,907,853 | 3/1990 | Hiratsuka | 385/123 |
| 5,016,970 | 5/1991 | Nagase et al. | 385/60 |
| 5,040,867 | 8/1991 | de Jong et al. | 385/60 |
| 5,071,218 | 12/1991 | Nishimoto | 385/60 |
| 5,096,312 | 3/1992 | Huang | 385/11 |
| 5,157,749 | 10/1992 | Briggs et al. | 385/60 |
| 5,166,995 | 11/1992 | Briggs et al. | 385/58 |

Primary Examiner—Brian Healy
Attorney, Agent, or Firm—Finnegan, Henderson, Farabow, Garrett & Dunner

[57] ABSTRACT

This invention presents a method and an apparatus for adjusting the axial orientation angle between the principal axis of a polarization maintaining fiber (PMF) and a ferrule with ease and precision. The invented ferrule is composed of a ferrule body, having a through hole into which a PMF is inserted, and a ring-shaped flange, having a keyway on the circumferential rim, installed on the outer periphery of the ferrule body. An engaging part is provided on the periphery to restrain the forward movement of the ferrule body by engaging with the flange. The invented ferrule enables adjustment of the axial angle, between the principal axis of the PMF and the keyway of the flange, to be made after adhesively bonding the PMF onto the ferrule body and polishing the end of the fiber. Therefore, the axial angle adjustment is carried out conveniently and accurately, without being affected by the processing effects, such as curing of the adhesive. Further, when the cable joint is made by joining the plugs, even if the spring compression forces, acting to press together the ferrule bodies, acted on the flange, the forward movement of the flange is restrained by the engaging part, thereby minimizing the adverse residual stress effects on the optical performance properties of the cable.

18 Claims, 10 Drawing Sheets

POLARIZATION MAINTAINING OPTICAL FIBER CONNECTOR INCLUDING POSITIONING FLANGE AND METHOD UTILIZING SAME

BACKGROUND OF THE INVENTION

This invention relates to optical cable connectors which maintain polarization of optical beams transported between the optical fibers themselves or between the fibers and optical devices such as a laser diode.

Among the various optical fibers, there are those fibers which are capable of maintaining the polarization of an optical beam. Such polarization maintaining fiber (referred to as PMFs hereinafter) has a feature that they maintain the direction of polarization of a linearly polarized beam entered into an optical fiber (hereinafter an optical fiber is referred simply as a fiber) in the direction of orientation of its principal axis.

A parameter for evaluating the performance of such PMFs is the extinction ratio between the intensity of a linearly polarized beam at the output end in the principal axis direction and the intensity of the beam in the direction perpendicular to the principal axis. For example, in a case of a short cable of about 10 m, a value of the extinction ratio between −40 to −50 dB has been realized.

Figure 1:
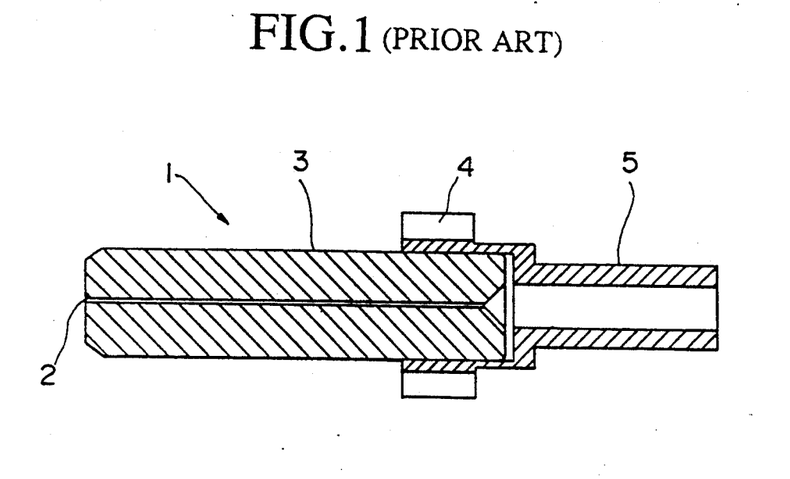
FIG. 1 is a cross sectional view of ferrule to explain the construction.

In such cases, the use of zirconia ferrules is disclosed for example, in a Japanese Patent Application, First Publication No. S61-170709, for easy connection and disconnection (referred to as mating) between PMFs themselves and between PMFs and optical devices, such as laser diode, which generate polarized beams. As shown in FIG. 1, such a zirconia ferrule 1 (hereinafter ferrule refers to zirconia ferrule,) is made of a cylindrical rod-shaped insertion portion 3 made of a unit body of zirconia, and having a through hole 2 for passing a fiber of a diameter which is slightly larger than the fiber, into a metal stem 5 provided with a keyway 4. A PMF is fixed firmly in the center of the ferrule 1, which is assembled into the plug housing of a connector. Optical connection is made by coupling two faces of ferrules together, which aligns the ends of two ferrules 1, when the end portion of ferrule 1 is inserted into the alignment sleeve of a precision inner diameter provided in an adaptor. The two end faces of the ferrules 1 are pressed tightly by means of the compression force of springs provided in the plug housing.

An example of the connectors of such a design is a threaded coupling FC-type optical cable connector (F01 Type Connectors for Optical Fiber Codes specified in JIS C 5970). This type of connector is composed of a cylindrical plug housing which houses the above-mentioned ferrule 1, and the optical connection is made by inserting this plug housing into an adaptor, and by completing the connection by means of a screw-on type coupling nut which tightens the plug housing onto the adaptor. Another type is a push-pull coupling SC-type optical cable connector (F04 Type Connectors for Optical Fiber Codes specified in JIS C 5973). This type is composed of a rectangular plug housing which houses the above-mentioned ferrule 1, and the plug housing is inserted and set in the adaptor.

However, in making such optical connections between the PMFs or between PMFs and optical devices, it is necessary to align the principal axis of each of the two fibers, i.e. to rotation align the axial angles.

For this reason, in the above mentioned FC-type connector, after the ferrule 1 has been assembled into the plug housing, an adjustment key is attached to the plug housing, and by rotating the adjustment key, the angular orientation between the adjustment key and the principal axis of the PMF is obtained. However, upon inserting a plug into an adaptor, the plug is rotated to align the key on the plug with the keyway in the adaptor after the ferrule has been set into the plug housing, therefore, there was a problem that the ferrule 1 is subjected to a twisting torque. Further, in this FC-type connector, when the coupling nut is tightened, there is a rotation, although slight, of the plug housing with respect to the adaptor, resulting in an application of additional torque on the ferrule 1. When the plug housing and the adaptor are put through repeated mating cycles, the principal axes of the two fibers to be connected became shifted, and produced random variations in the extinction ratio, as illustrated FIG. 2.

Figure 2:
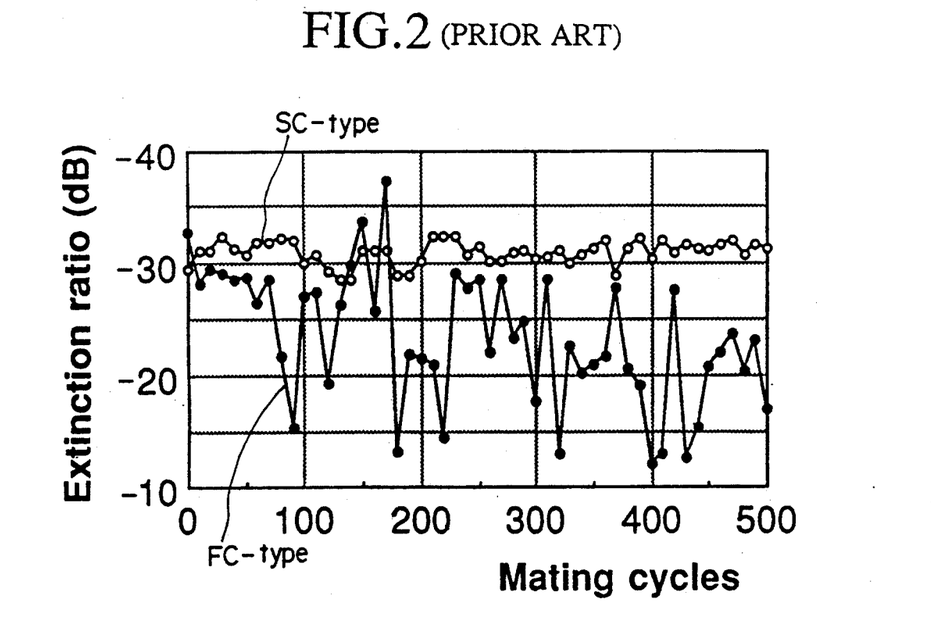
FIG. 2 is a graph showing the changes in the extinction ratio which occur as a result of repeated mating cycles of FC-type and SC-type connectors with a ferrule having a PMF fixed in place.

On the other hand, when fixing the PMF in the ferrule 1 in the above mentioned SC connector, the axial angle between the ferrule 1 and the keyway 4 are preadjusted, and the pre-adjusted ferrule 1 is set into the adaptor. Further, the direction of insertion of the adaptor of the SC-type connector involves only a movement in the longitudinal direction, and the alignment of the axial angle with the adaptor is carried out before the ferrule is inserted into the alignment sleeve, therefore, there is no torque imposed on the ferrule due to insertion of the plug. It follows, therefore, that even after repeated mating cycles, it is possible to retain a relatively constant extinction ratio as shown in FIG. 2.

The methods of adjusting the principal axis of the fiber with respect to the ferrule and fixing the fiber on the ferrule are disclosed, for example, in Japanese Patent Application First Publication No. H1-232308.

Figure 3:
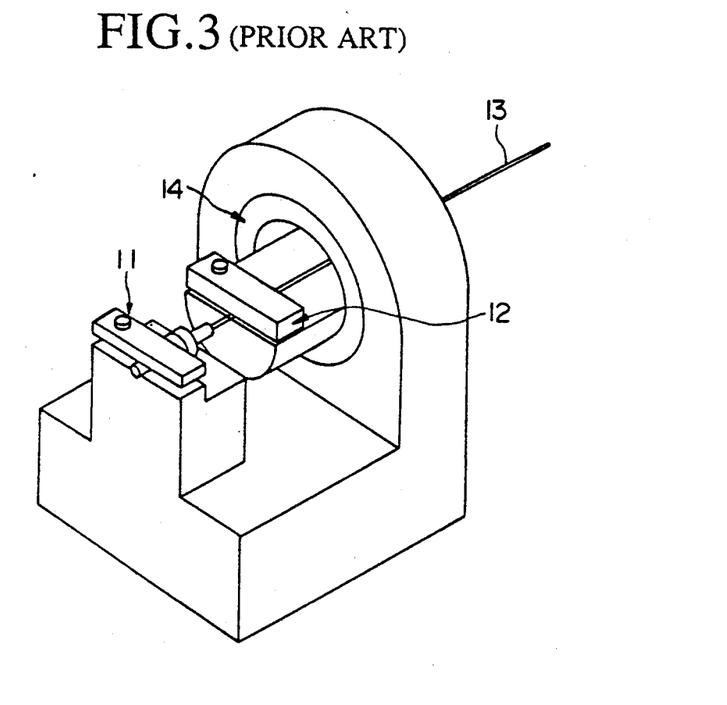
FIG. 3 is a perspective view of an assembling device for bonding a PMF into a ferrule.

FIG. 3 shows the assembling device used in the above mentioned method, in which the numeral 11 is a ferrule locking part which holds the ferrule in place, 12 is a fiber retention part which holds the PMF 13 and 14 is a rotation means for rotating the fiber fixing part.

The assembling order is, first, a fiber 13 whose end has been cleaved at right angles to the fiber axis is inserted into a ferrule 1, which is secured in the ferrule locking part 11 by engaging a key (not shown) into a keyway 4 provided on the ferrule 1.

Then, the coated optical fiber of the PMF 13 is fixed on the fiber retention part 12. Next, while observing the end face of the PMF 13 under a microscope, the PMF 13 is axially rotated by means of the rotation means 14 to set the PMF 13 in position. The rotation means 14 is locked in position, and the ferrule 1 is taken out first, and the ferrule i is filled with an adhesive, the locked PMF is re-inserted and the ferrule 1 is secured in position in the ferrule locking part 11. At this time, the key of the ferrule locking part 11 and keyway 4 of the ferrule 1 are engaged. The assembly is placed in an oven to harden the adhesive.

By following such a procedure, it is possible to bond the PMF 13 in the ferrule 1 while maintaining the certain required axial angle between the principal axis of the PMF and the ferrule key 4. However, the above mentioned assembling procedure presented the following problems.

(1) During the adhesive curing period lasting approximately two hours, the assembling device is monopolized by one ferrule, resulting in extreme inefficiency of production.

(2) Unlike the ordinary single mode fibers, because PMFs retain large residual stresses in the fiber, even when the fiber is cleaved, it is difficult to obtain perpendicular fracture surface, and consequently, it is difficult to identify the location of stress-applying parts.

(3) Because the coated section of the PMF 13 is held in the fiber retention part 12, the fiber is able to rotate in the coated part during heating, resulting in a deviation of the preset axial angle.

The assembling cost becomes high due to the above factor (1), and the setting precision is degraded by the factors (2) and (3).

SUMMARY OF THE INVENTION

An objective of the present invention is to present a method of adjusting the axial angle between the principal axis of a PMF and a ferrule with ease and precision, with the use of a plug housing of the SC-type cable connector which utilizes push-pull type of coupling.

The ferrule of the present invention for polarization maintaining fibers (PMFs) comprises a ferrule body having a through hole into which an optical fiber is inserted; and a ring shaped flange having a keyway, for installation on the peripheral side of the ferrule body, in which a locking means for engaging with and restraining the longitudinal movement of the flange is disposed on the peripheral side of the ferrule body.

According to the ferrule of such a design, the fiber is bonded to the ferrule, and after the ferrule end of the fiber has been ground and polished, the alignment of the axial angle between the principal axis of the fiber and the keyway of the flange is performed. Further, when the two plugs are mated manually, the spring compression forces act to press the two ends of the PMFs tightly together so as to transmit proper optical signals, via the flange attached to the ferrule body. In this case, although the compression forces act on the flange, the peripheral rim disposed on the outer periphery of the ferrule body, prevents the movement of the flange in the longitudinal direction. Therefore, it is only necessary to attach the flange to the ferrule body so as not to have the flange rotate during use, therefore, the insertion pressure of the flange can be kept minimized, thus minimizing the adverse effects of residual stresses on the optical performance of the PMF. The degradation of the extinction ratio is thereby eliminated. This leads also to a possibility of attaching a flange onto the ferrule with adhesives of relatively weak bonding strength.

The invented method of assembling the ferrule for use with PMFs comprises the steps of: securing the PMF onto the ferrule body; grinding and polishing the end of the ferrule; holding the ferrule body rotatably, inserting the aligned flange onto the ferrule body; adjusting the axial angle between the principal axis of the PMF and the angular orientation of the flange key by rotating the ferrule body axially with respect to the aligned flange while observing the polished end of the PMF; and locking the aligned flange onto the ferrule body.

According to the method of assembling the ferrule presented above, because the alignment of the axial angle between the principal axis of the fiber and the flange key is performed after the fiber has been secured onto the ferrule, there is no deviation of the alignment caused by the rotation of the fiber inside the fiber coating, which occur in the process of fixing the axial angle first and then performing the adhesive bonding of the PMF in the ferrule. Further, because the alignment process is carried out while observing the polished end of the PMF, the stress-applying parts are observable clearly, thus permitting the axial alignment to be carried out easily and accurately.

Further, the optical cable connectors of the present invention is a push-pull SC-type connector having a plug body comprising a ferrule and a flange; in which the ferrule is provided with a key, and the key is engaged with a keyway disposed on the flange which connects onto a ferrule which contains a polarization maintaining fiber having the aligned principal axis; and a rectangular plug housing provided with springs for biasing the flange on the ferrule in the longitudinal direction of said cable.

According to the cable connector of such a design, because the connector is a push-pull type SC connector, in which the plug housing houses the adaptor is housed in a plug housing, there is no imposed toque at the time of connecting the ferrule with the adaptor. Therefore, the connector can be subjected to repeated mating without introducing a deviation in the aligned angle between the principal axis of the PMF and the plug housing, thereby enabling the connector to retain the original extinction ratio consistently throughout the service life of the connector.

BRIEF DESCRIPTION OF THE DRAWINGS

FIG. 5 (a) is a front view of a ferrule to which a PMF has been bonded.

FIG. 5 (b) is a side view of a ferrule to which a PMF has been bonded.

FIG. 6 (a) is a side view of a ferrule body to show the shape thereof.

FIG. 6 (b) is a side view of a ferrule body to show the shape thereof.

FIG. 7 (a), (b) and (c) are side views of a ferrule to explain the steps for bonding a PMF to a ferrule.

FIG. 7 (d) is a cross sectional view of a ferrule to which a PMF is bonded.

FIG. 13 (a) and (b) show illustrations of the monitoring views seen through a microscope for explaining the steps for adjusting the principal optical axis of a PMF.

FIG. 16 (a) is a front view of a plug housing with an inserted ferrule for explaining the structure of the plug housing of the SC-type connector.

FIG. 16 (b) is a partial cross sectional view of a plug housing with an inserted ferrule for explaining the structure of the plug housing of the SC-type connector.

PREFERRED EMBODIMENT OF THE PRESENT INVENTION

A preferred embodiment is explained in the following with reference to the figures.

Figure 4:
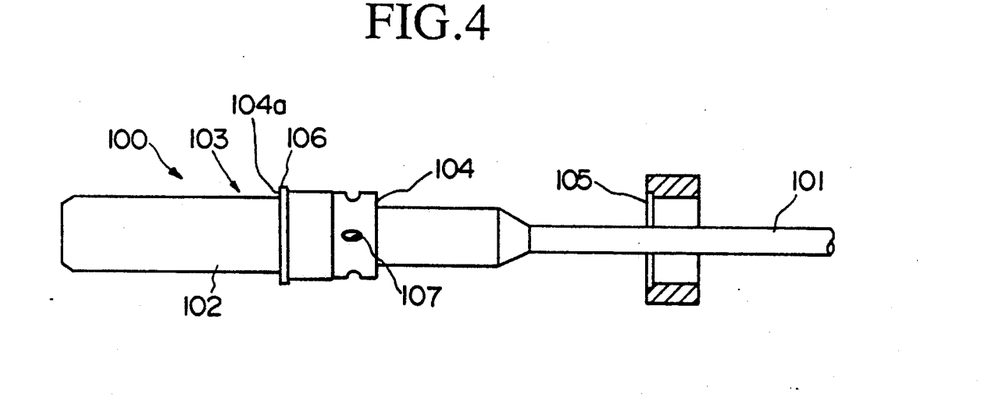
FIG. 4 shows a side view of a ferrule body to which a PMF is to be installed, and a cross sectional view of a flange which is to be attached to the ferrule body.
Figure 5A:
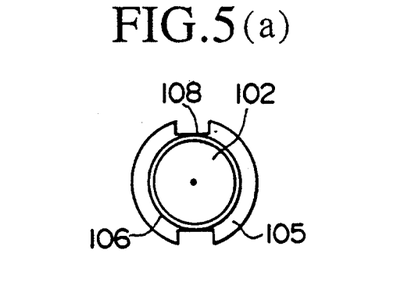
Figure 5B:
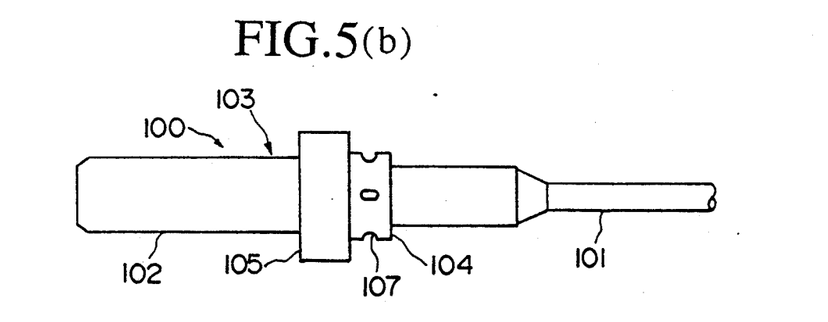

In FIGS. 4 and 5 (a) and (b), the numeral 100 represents a ferrule, which consists of a ferrule body 103 and a flange 105. The ferrule body 103 is provide with a through hole having a diameter slightly larger than the diameter of the fiber, and consists of an insertion part 102 made of a rod shaped unit body of zirconia and a holding part 104 made of a metal to fit into the insertion part 102.

The holding part 104 is provided with an engaging part 106 around the circumferential rim at the forward region 104a of the holding part 104. When the flange 105 is installed onto the holding part 104, the flange 105 is locked in place by making contact with the engaging part 106.

Figure 6A:
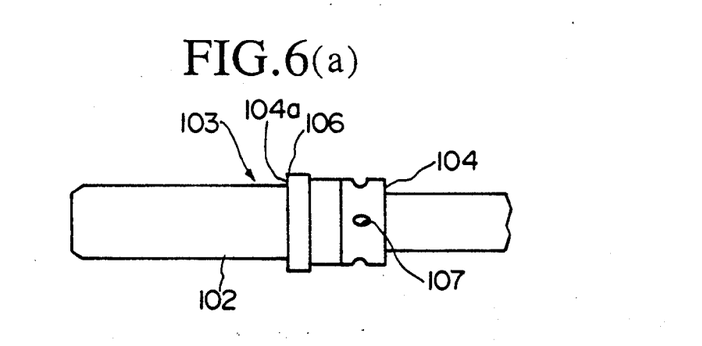
Figure 6B:
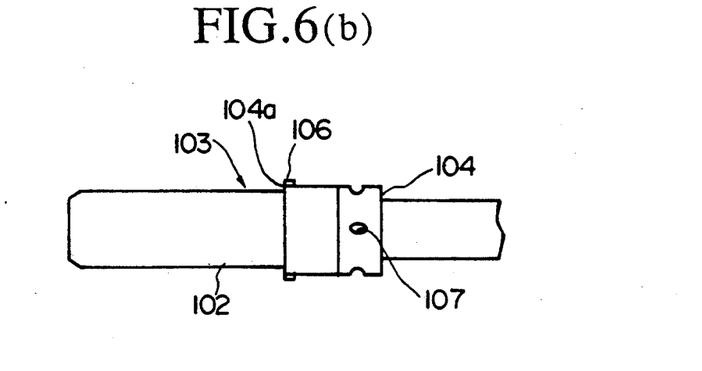

The shape of the above noted engaging part 106 may be a step shape or a protrusion shape protruding from the holding part 104, as illustrated in FIG. 6 (a) and (b).

The holding part 104 is also provided with an air (exit) hole 107 disposed near the rear region of the insertion part 102, for the purpose of linking the exterior space with the interior space of the holding part 104.

Figure 16A:
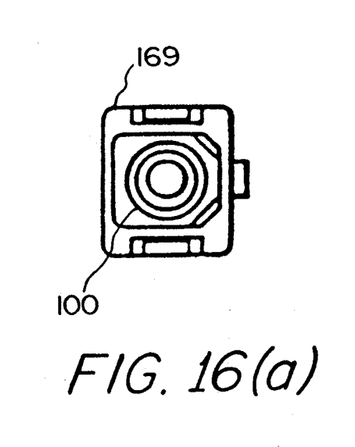
Figure 16B:
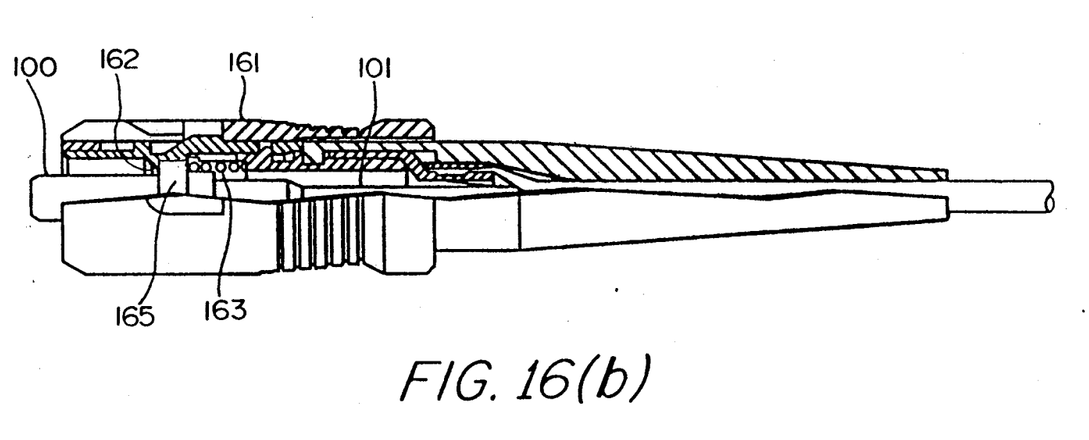

The flange 105 is provided with a keyway 108 which engages with the key 162, in FIG. 16 (b), disposed on the plug housing into which the ferrule 100 is inserted.

This flange 105 is passed through the PMF 101 before the PMF 101 is adhesively bonded to the ferrule body 103, and the flange is assembled onto the holding part 104 from the rear region thereof, after the fiber has been bonded to the ferrule body 103 and the ferrule end of the fiber has been polished.

The method of assembling the ferrule 100 so constructed will be explained, next.

The step of adhesively bonding a PMF 101 onto the ferrule body 103 will be explained first.

As shown in FIG. 7 (a), drops of an adhesive liquid 111 are applied to the side surface of the holding part 104 of the ferrule body 103. Then, the liquid 111 is made to drip downward to fill the holding part 104. The air inside the holding part 104 is expelled outward through the air hole 107. Therefore, the adhesive liquid 111 is able to spread through in the holding part 104 uniformly without leaving any air bubbles.

Next, by closing the air holes 107 with a rubber tube 112, as shown in FIG. 7 (c), and attaching a vacuum hose to the end of the insertion part 102, the adhesive liquid 111 is made to fill the through hole.

Next, a PMF 101 is inserted into the through hole of the ferrule body 103, as shown in the cross sectional view of FIG. 7 (c), and heat is applied to harden the adhesive liquid 111. Later, the end of the ferrule body 103 is ground and polished to form a semispherical shape.

Figure 7A:
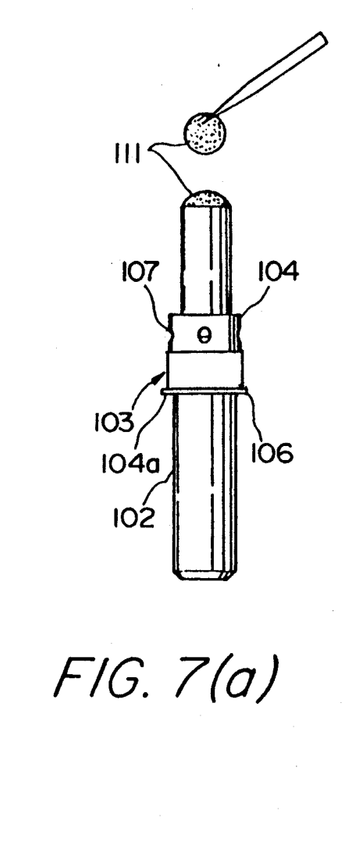
Figure 7B:
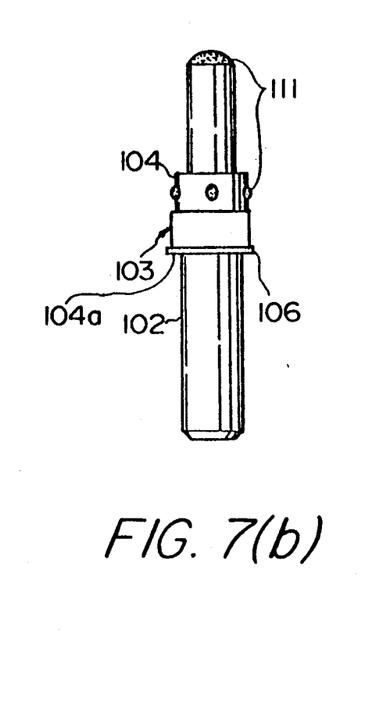
Figure 7C:
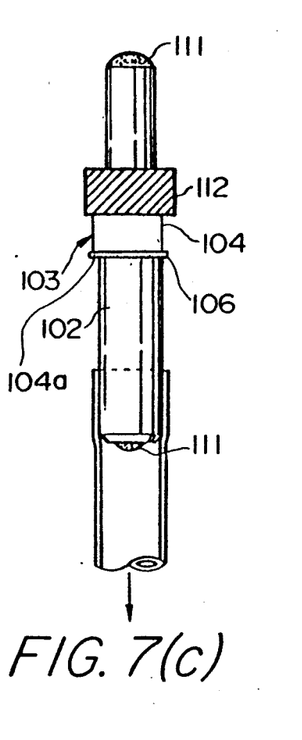
Figure 7D:
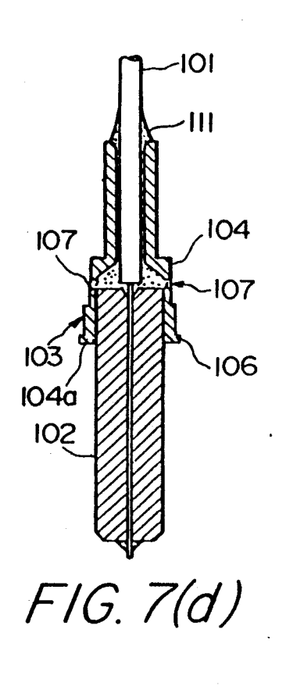

By following the method as described above, it is possible to fill the space in the ferrule 100 uniformly, thereby eliminating curving of the fiber 101 caused by uneven filling of the adhesive liquid 111.

Next, the procedure will be described for installing the flange 105 onto the ferrule 103 to which a PMF 101 has been bonded.

Figure 8:
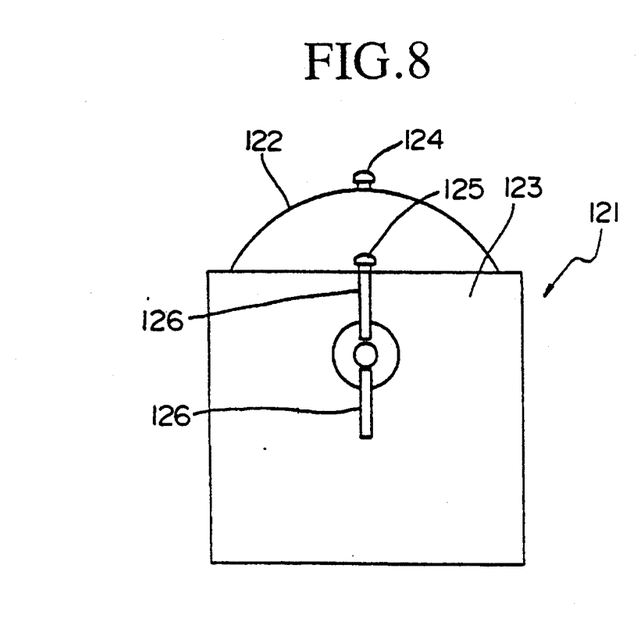
FIG. 8 is a front view of the assembling device for attaching a flange onto a ferrule.
Figure 9:
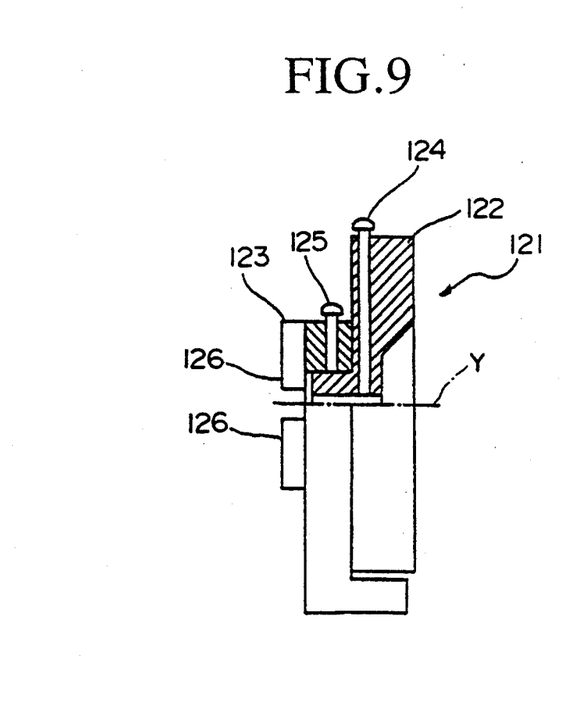
FIG. 9 is a partial cross sectional side view of the assembling device for attaching a flange onto a ferrule.

In FIGS. 8 and 9, the numeral 121 represents an assembling apparatus, which consists of a ferrule locking part 122 for locking the ferrule body 103 in position, and a flange holding part 123 which is disposed on the same axis as the ferrule locking part 122, and which permits the flange 105 to slide along longitudinally.

The ferrule locking part 122 is able to rotate around the center axis of the ferrule body 103 inserted in the center of the ferrule locking part 122.

The ferrule locking part 122 is provided further with a locking screw 124, which locks the ferrule body 103 in position on the central axis Y shown in FIG. 9.

The flange holding part 123 is disposed in the forward region of the ferrule locking part 122, sharing the common central axis Y mentioned above. A stopper key 126 is provided in the forward region of the flange holding part 123 which fixes the position of the flange 105 along the Y axis.

On the flange holding part 123 is provided a locking screw 125 which radially fixes the position of the ferrule locking part 122 by preventing the rotation thereof.

Next, the procedure for assembling the flange 105 onto the ferrule body 103 with the assembling apparatus 121 will be explained.

Figure 10:
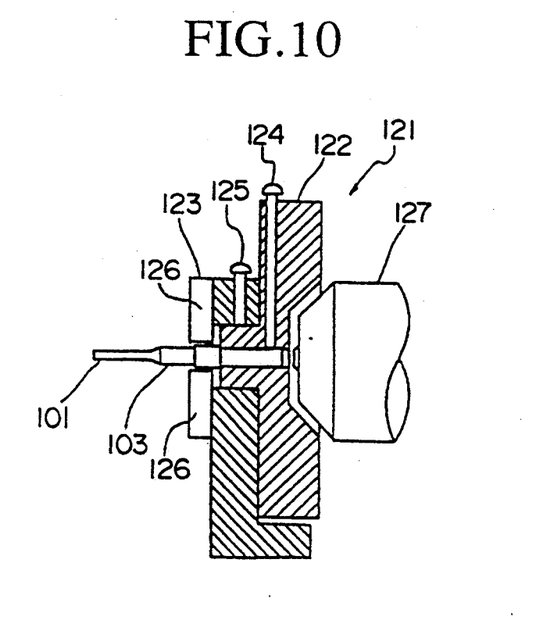
FIG. 10 is a cross sectional view of the assembling device for explaining the steps for attaching a flange onto a ferrule.

First, as shown in FIG. 10, the ferrule body 103, which has a PMF installed therein and which has the end thereof ground and polished in a semispherical shape, is inserted in the ferrule locking part 122 of the assembling apparatus 121 and is secured in position by the locking screw 124.

Figure 11:
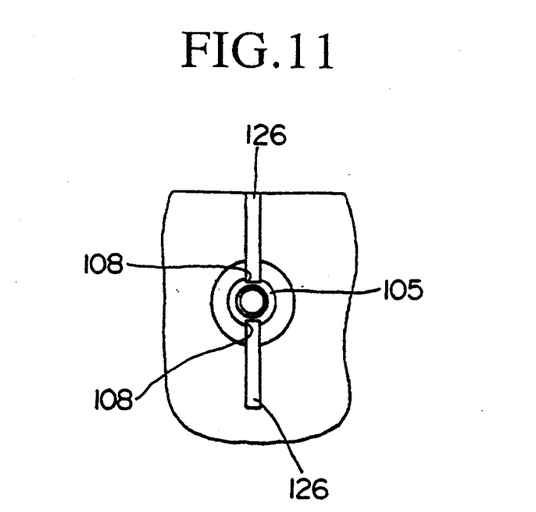
FIG. 11 is a front view of a part of the assembling device for attaching a flange onto a ferrule.

Next, as shown in FIG. 11, the stopper key 126 of the flange holding part 123 is engaged with the keyway 108, and the flange 105, which had been pre-inserted in the PMF 101, is advanced and retained halfway.

Figure 12:
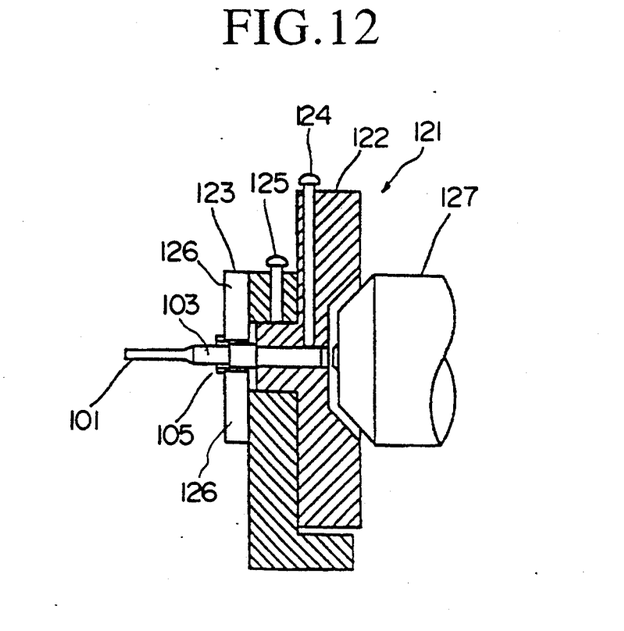
FIG. 12 is a cross sectional view of the assembling device for explaining the steps for attaching a flange onto a ferrule.

In this condition, the end face of the PMF 101 is observed through a microscope 127 provided on the forward end of the PMF 101, as shown in FIG. 12.

Figure 13A:
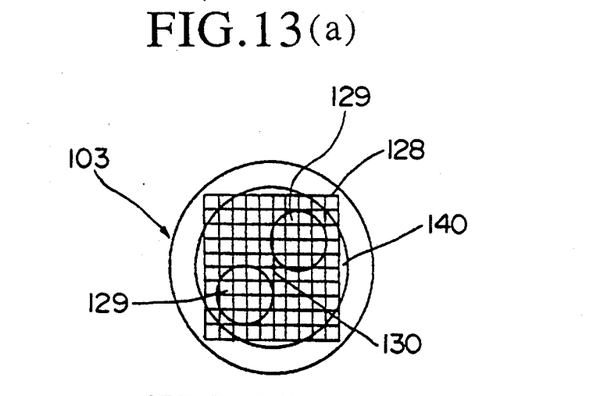
Figure 13B:
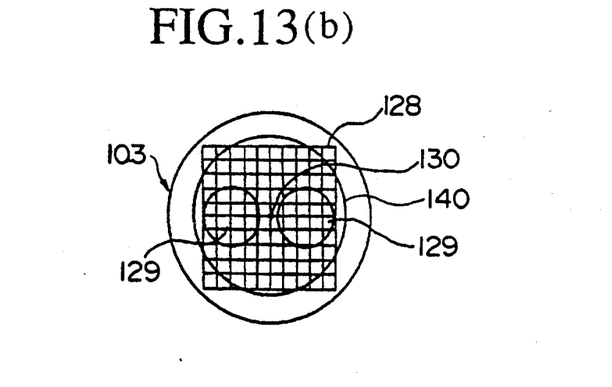

As an example of PMFs, a cross sectional view of a PANDA fiber is shown in FIG. 13. In this fiber, there are two stress-applying parts 129 (referred to as SAPs) on both sides of the core 130 which are observable under an optical microscope. The principal axis of such a fiber can be regarded to be either a line joining the centers of the two SAPs or a line perpendicular to such a line.

Next, if the two SAPs 129 of the PMF 101 seen in the graticules of the microscope 127 are not aligned, as illustrated in FIG. 13 (a), by means of the rotation of the ferrule locking part 122, the cladding layer 140 is rotated about the core 130 of the fiber to obtain alignment of the two SAPs 129 as illustrated in the graticules shown in FIG. 13 (b). The orientation of the graticules 128 is preadjusted to the orientation of the stopper key 126.

Next, by tightening the locking screw 125 on the flange holding part 123 to prevent the rotation of the ferrule locking part with respect to the ferrule holding part 123, the ferrule locking part 122 is secured in position.

Figure 14:
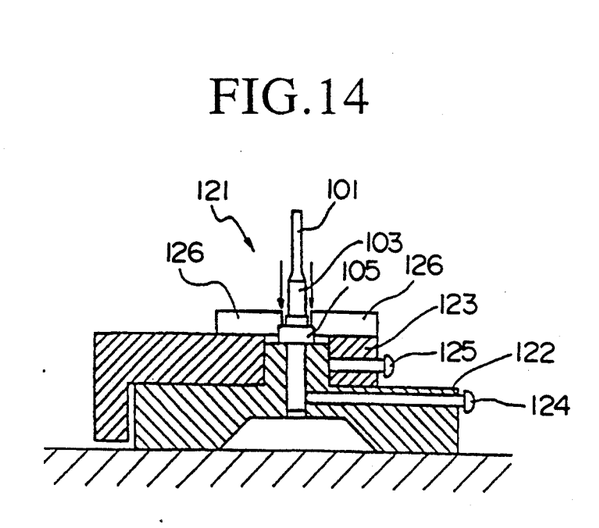
FIG. 14 is a cross sectional view of the assembling device for explaining the steps of pressing a flange onto a ferrule.

In this condition, the microscope 127 is removed from the assembly apparatus, and using any commonly available tool, the flange 105 is pressed onto the ferrule body 103 as shown in FIG. 14.

In this case, the ferrule locking part 122 can be utilized as a holding device for the ferrule body 103.

Also, if pressing is not to be employed, the flange 105 may be attached to the ferrule body 103 by coating the ferrule body with an adhesive first and pushing the flange 105 onto the ferrule 103. Such an operation can be carried out manually, without resorting to any special tools. Fast curing epoxy is a suitable adhesive material.

By following the procedure presented above, it is possible to adjust the axial angle between the flange keyway 108 of the flange 105 and the SAPs 129 of the PMF 101, and lock the flange 105 onto the ferrule body 103.

Figure 15:
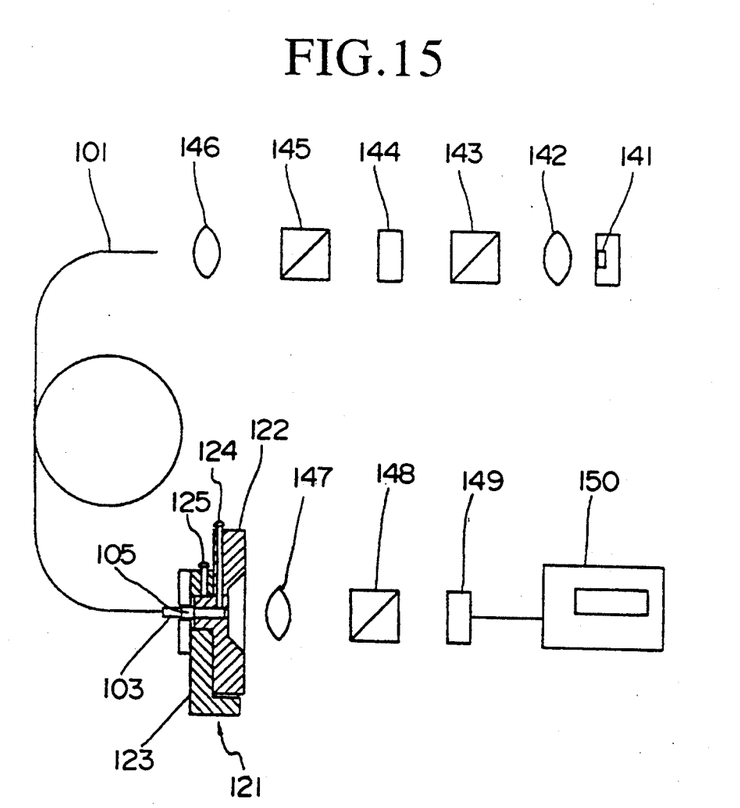
FIG. 15 is a schematic illustration of the optical measuring system for adjusting the principal axis of a PMF.

Further, FIG. 15 shows another optical measuring system, in place of a microscope 127, for use in adjusting the axial angle between the principal axis of the PMF 101 and the keyway 108 of the flange 105.

In FIG. 15, the numeral 141 represents a laser diode (LD) light source; 142, 146 and 147 are optical lenses; 143, 145 and 148 are polarizers; and 144 is a quarter wave plates.

First, the principle of this optical measuring system will be explained.

The light beam from a LD light source 141 is collimated by the lens 142, and is linearly polarized by the polarizer 143. Upon passing through the quarter wave plates 144, the beam becomes circularly polarized, and is converted back to linear polarization by the polarizer 145, and enters the PMF 101 through the lens 146.

In this case, because the beam entering the polarizer 145 is circularly polarized, it is possible to inject linearly polarized beam of any specific orientation into the PMF 101 by rotating the polarizer 145.

The beam passing through the PMF 101 and exiting from one end of the ferrule body 103, which is secured in place by the ferrule locking part 122, is collimated and after passing through a polarizer 148, enters a light sensor 149, and the intensity is measured by an optical power meter 150.

By measuring the light intensity while rotating the principal axis of the PMF 101, the degree of polarization of the exiting beam can be measured.

Next, a method of determining the orientation direction of the principal axis of the PMF 101 with the use of the above optical measuring system will be explained.

The PMF 101 maintains polarization only when the linearly polarized light in entered thereto, coincident with the principal fiber axis, and in such a condition, the exiting beam is the closest to being linearly polarized. In other words, when the beam intensity is measured at the beam exiting side in FIG. 15, while rotating the polarizer 148, the minimum intensity is obtained when the orientation direction of linear polarization at the entry side coincides with the principal axis.

Therefore, by rotating both polarizers 145 and 148 and by identifying the position of minimum light intensity, the orientation direction of the polarizer 148 can be equated with the orientation of the principal axis of the PMF 101.

Therefore, the flange holding part 123 of the assembling apparatus 121 is pre-aligned with the orientation direction of the principal axis of the polarizer 148, by first rotating the polarizer 145 and the ferrule locking part 122, and by locking the ferrule locking part 122 in position in the flange holding part 123, when the intensity becomes a minimum. Next, the aligned flange 105 is pressed onto the ferrule body 103 along the keyway 108, thereby obtaining a ferrule 100 in which the orientation direction of the principal axis of the PMF 101 is aligned with the keyway 108 of the flange 105.

This optical measuring system is particularly suitable for those fibers, such as ellipsoidal core fibers, for which it is difficult to determine the orientation direction of principal axis from the observation of the fiber end.

Next, the procedure will be described for assembling a ferrule 100 for which the principal axis of the PMF 101 has been aligned with the keyway 108 of the flange 105, into a plug housing of the current SC-type optical connector.

As shown in FIGS. 16 (a) and (b), the ferrule 100 is inserted into the plug housing 161 so that the rotation of the ferrule 100 is restricted by the key 162 of the plug housing 161 which is engaged with the keyway 108 of the flange 105.

Further, in the plug housing 161, there is a spring 163 which compresses the flange 105 so that the ferrule 100 is pressed toward the end region of the plug housing.

Therefore, when the two plug housings 161 are connected to the adaptor of the SC-type connector, the ends of each ferrule 100 are pressed against each other by the action of the springs 163 installed in each plug housing 161.

According to the ferrule 100 of such a design, the flange 105, inserted onto the flange holding part 104, is engaged with the engaging part 106 of the flange holding part 104. Therefore, when the plugs are inserted into an adaptor from both ends, the springs 163 butt the two ends faces of the ferrule 100 tightly so as to transmit optical signals properly. In this case, the flange 105 cannot slip through to the forward end of the ferrule 100 even if the flange is under the force of the springs 163, because the flange is held in position by the engaging part 106 disposed on the ferrule body 103.

Therefore, it is possible to lower the required insertion pressure of the ferrule 103 into the flange 105 to a value just sufficient to prevent the rotation of the flange 105 around the ferrule body 103, thereby enabling to minimize the adverse residual stresses effects on the optical performance properties of the PMF 101. Further, the flange 105 can also be bonded onto the ferrule body 103 with a relatively low strength adhesive material.

Further, because the ferrule 100 is composed of a ferrule body 103 and a flange 105 having a keyway 108, various adjustment operations can be performed individually before assembling: such as adhesively bonding of a PMF 101 to the ferrule body 103; grinding and polishing of the end of the ferrule body 103; and alignment of the axial angle of the principal axis of PMF 101 by either observing the end face of the ferrule body 103 with a microscope or by monitoring of the linearly polarized beam entered into the entrance end from the opposite end of the PMF 101. Therefore, the efficiency of adjustment of the axial angle between the principal axis of the PMF 101 and the keyway 108 of the flange 105 can be improved significantly.

Further, unlike the case of observing the end surface of stress fractured PMF 101, because the polished end surface of the PMFs is observed through the microscope 127, the outlines of the SAPs 129 can be readily confirmed. Further, because the adjustment operations of the axial angle between the principal axis of the PMF 101 and the flange 105 is carried out after the adhesive has been cured, there is little deviation in the aligned angle, unlike the case of performing adhesive curing after the completion of the axial angle adjustments.

Therefore, it is possible to set the axial angle, between the orientation direction of the principal axis of the PMF 101 and the keyway 108 of the flange 105, at high precision.

Figure 17:
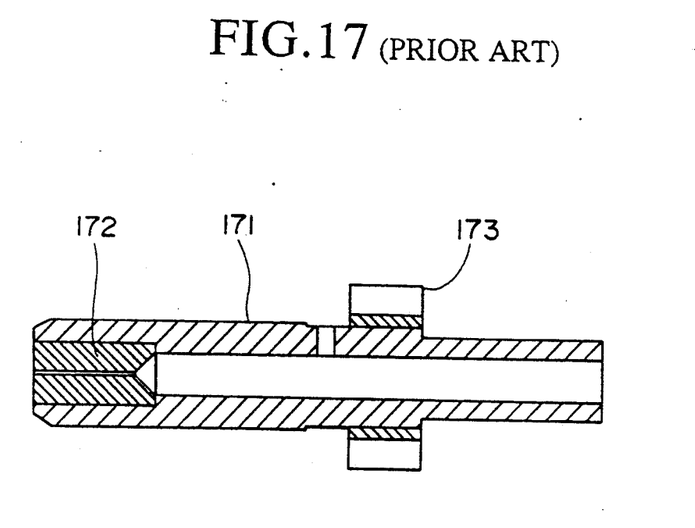
FIG. 17 is a cross sectional view to explain the structure of another ferrule.

Further, other arrangements, such as the one shown in FIG. 17 for pressing a ferrule into a flange, are known.

In this ferrule construction, the ferrule body 171 is made of a metal into which a ceramic capillary tube 172 is embedded. Such a structure is usually produced by machining in one piece, but because it is necessary that the ferrule body 171 which is inserted into the alignment sleeve of the adaptor be made of a difficult-to-fabricate hard material, the flange 173 is made separately of a fabricable material and inserted afterwards so as to improve the overall manufacturing. Further, the objective of this disclosed approach is to perform the flange 173 insertion into the ferrule 171 at the time of manufacture of the ferrule, and is different from the objective of the present invention Further, in the present invention, because the engaging part 106 is disposed at the forward region 104a of the holding part 104, the pressing force for the flange 105 is sufficient if the flange 105 does not rotate easily after the installation. Therefore, it is possible to minimize the residual stress effect on the optical performance properties of the PMF 101. However, for the ferrule design shown in FIG. 17, it is necessary to attach the flange 173 firmly in the ferrule body 171 so as not to slip off afterwards, and strong residual stresses will remain in the ferrule body 171.

It should be noted that, in general, the PMF 101 maintains polarization by the birefringence in the core of the transmitting light beam. Therefore, by attaching the flange 173 firmly onto the ferrule body 171 after the PMF 101 has been bonded in the ferrule, residual stresses effect can degrade the behavior of the PMF 101 in such a way to generate birefringence in other directions, thereby leading to degradation of the extinction ratio. Therefore, the ferrule of the design shown in FIG. 17 is incompatible with the objective of the present invention to carry out pressing operation after bonding of the PMF 101.

What is claimed is:

1. An optical cable connecting means for providing an optical connection between two polarization maintaining fibers, and between said polarization maintaining fibers and other optical devices, such as a laser diode, so as not to degrade the performance of said polarization maintaining fiber: said cable connecting means comprising;
   (a) a ferrule body having a through hole for receiving a polarization maintaining fiber (PMF), and said ferrule body being bonded to said polarization maintaining fiber and being provided with air exit holes communicating between interior and exterior spaces of said ferrule body;
   (b) a ring shaped flange having a keyway, for installation on the circumferential periphery of said ferrule body; and
   means for engaging said flange and restraining the longitudinal moment thereof, said engaging means begin disposed on the circumferential periphery of said ferrule body.

2. An optical cable connecting means as claimed in claim 1, wherein said ferrule body is provided with not less than two air exit holes.

3. A method for assembling an optical cable connecting means for making an optical connection between two polarization maintaining fibers, and between said polarization maintaining fibers and other optical devices, such as a laser diode so as not to degrade the signal performance of said polarization maintaining fiber: said method comprising the steps of:
   (a) adhesively bonding a polarization maintaining fiber (PMF) at one end of a ferrule body;
   (b) polishing said one end of said ferrule body so as to polish the end of said PMF;
   (c) holding said ferrule body from step (b) so as to be rotatable axially;
   (d) aligning a flange by means of a keyway provided thereon so as to provide a selected angular orientation of said keyway with respect to the fiber axis;
   (e) installing said aligned flange onto said ferrule body;
   (f) adjusting the axial angle between the principal axis of said PMF and the angular orientation of said flange keyway by rotating said ferrule body axially with respect to said aligned flange while observing said polished end of said PMF;
   (g) locking said aligned flange onto said ferrule body.

4. An assembling apparatus for assembling an optical cable connecting means for making an optical connection between two polarization maintaining fibers, and between said polarization maintaining fibers and other optical devices, such as a laser diode so as not to degrade the performance of said polarization maintaining fiber: said apparatus comprises:
   (a) a ferrule locking means, which axially and rotatably holds a ferrule body, for locking the alignment of said ferrule body in which a polished end of a polarization maintaining fiber (PMF) is adhesively bonded;
   (b) a flange holding means, which insertably holds a flange part, for aligning said flange with respect to said ferrule body; and
   (c) an optical measuring means for measuring the orientation angle of the principal axis of said PMF.

5. An assembling apparatus as claimed in claim 4, wherein said optical measuring means comprises an optical microscope disposed on the end of said ferrule body containing said polished end of PMF.

6. An assembling apparatus as claimed in claim 4, wherein said optical measuring means comprises polarized beam generation means for injecting a linearly polarized beam aligned with the principal axis of said PMF into an end of said PMF including said polished end of said PMF; and means for adjusting the principal axis of said PMF after measuring the orientation direction of polarization of the exiting beam from the opposite end to said end of said PMF.

7. An assembling apparatus as claimed in claim 6, wherein said optical measuring means comprises:
   (a) a light source such as a laser diode LD for generating a laser beam;
   (b) lenses which collimate said laser beam;
   (c) polarizers to transform the collimated laser beam from (b) into a linearly polarized beam;
   (d) quarter wave plates to transform said polarized beam from (c) into a circularly polarized beam;
   (e) polarizers to transform said circularly polarized beam from (d) into a linearly polarized beam;

(f) lenses which focuss said linearly polarized beam from (e), and inject the beam into the end of said cable opposite to said ferrule body containing said PMF;

(g) lenses which collimate the beam which passes through the cable and exits from the ferrule body end;

(h) polarizers which receive the collimated beam from (g);

(i) a light sensor which responds to the collimated beam from (i); and (j) an optical power meter which measures the intensity of the beam from (i)

8. An optical cable connecting means for making an optical connection between two polarization maintaining fibers, and between said polarization maintaining fibers and other optical devices, such as a laser diode so as not to affect the signal carrying performance of the polarization maintaining fiber: said cable connecting means is a push-pull SC-type connector having an adaptor and a plug body; said plug body comprising:

(a) a plug housing having an adjustment key which engages with a keyway formed on the circumferential periphery of a flange of a ferrule, said housing for retaining said ferrule having said keyway aligned with the principal axis of a polarization maintaining fiber; and (b) a rectangular plug housing provided with springs for providing compressive biasing forces to said flange on said ferrule in the longitudinal direction of said cable.

9. A method for assembling a ferrule formed substantially in a cylindrical shape and including an optical fiber, comprising the steps of:

(a) inserting a polarization maintaining fiber into a through hole formed along a central axis of the ferrule body;

(b) fixing said polarization maintaining fiber to the ferrule body;

(c) fixing a ring shaped flange on the circumferential periphery of the ferrule body, thereby enabling said flange to circumferentially position the ferrule body to a counterpart ferrule.

10. A method for assembling a ferrule including an optical fiber according to claim 9, wherein the step of fixing a flange to the circumferential periphery of he ferrule body comprises the steps of:

monitoring the end surface of said polarization maintaining fiber;

rotating said flange relative to the polarization maintaining fiber; and fixing said flange to the ferrule body to maintaining the circumferential position of said flange relative to said polarization maintaining fiber.

11. A method for assembling a ferrule including an optical fiber according to claim 10, further comprising a step of polishing the end surface of said polarization maintaining fiber before monitoring.

12. A method for assembling a ferrule including an optical fiber according to claim 9, wherein said flange is fixed to said ferrule body by adhesive bonding.

13. A method for assembling a ferrule including an optical fiber according to claim 9, wherein said polarization maintaining fiber is fixed to said ferrule body by adhesive bonding.

14. A method for assembling a ferrule including an optical fiber according to claim 9, wherein said flange is fixed to said ferrule body after rotating said flange while holding said ferrule body.

15. An assembly for manufacturing a ferrule, having a flange, for connecting optical cables by being coupled to a counterpart ferrule, said assembly comprising:

(a) a ferrule body formed in a substantially cylindrical shape having a through hole formed along a central axis for receiving an optical fiber; and (b) a polarization maintaining fiber inserted in said through hole of said ferrule body and fixed to said ferrule body;

(c) means, formed on a peripheral surface of said ferrule body, for connecting the flange to said ferrule body in any desired circumferential direction to thereby position said ferrule body in a circumferential direction relative to the counterpart ferrule.

16. An assembly for manufacturing a ferrule according to claim 15, said connecting means connecting the flange to said ferrule body in a rotatable manner.

17. An assembly for manufacturing a ferrule according to claim 15, wherein said polarization maintaining fiber includes a polished end.

18. An assembly for manufacturing a ferrule according to claim 15, wherein said polarization maintaining fiber is fixed to said ferrule body by adhesive bonding.

* * * * *

UNITED STATES PATENT AND TRADEMARK OFFICE
CERTIFICATE OF CORRECTION

PATENT NO. : 5,216,733
DATED : June 01, 1993
INVENTOR(S) : Ryo Nagase et al.

It is certified that error appears in the above-indentified patent and that said Letters Patent is hereby corrected as shown below:

Claim 1, column 9, line 66, change "moment" to --movement-- and "begin" to --being--.

Claim 7, column 11, line 1, change "focuss" to --focus--.

Claim 10, column 12, line 1, change "he" to --the--.

Claim 10, column 12, line 7, change "maintaining" to --maintain--.

Claim 10, column 11, line 13, (counting from top of column and not by margin numbers) after "from(i)" insert --.--. *

Signed and Sealed this

Fifth Day of April, 1994

Attest:

BRUCE LEHMAN

*Attesting Officer*     *Commissioner of Patents and Trademarks*